United States Patent
Gehring (10) Patent No.: US 11,218,820 B2
(45) Date of Patent: Jan. 4, 2022

(54) HEARING DEVICE WITH MULTIPLE CONSISTENT CONTROLLERS

(71) Applicant: Sonova AG, Staefa (CH)

(72) Inventor: Stephan Gehring, Uerikon (CH)

(73) Assignee: Sonova AG, Staefa (CH)

( * ) Notice: Subject to any disclaimer, the term of this patent is extended or adjusted under 35 U.S.C. 154(b) by 328 days.

(21) Appl. No.: 16/539,017

(22) PCT Filed: Feb. 14, 2017

(86) PCT No.: PCT/EP2017/053207
§ 371 (c)(1),
(2) Date: Aug. 14, 2019

(87) PCT Pub. No.: WO2018/149470
PCT Pub. Date: Aug. 23, 2018

(65) Prior Publication Data
US 2020/0021928 A1    Jan. 16, 2020

(51) Int. Cl.
*H04R 25/00* (2006.01)
*H04R 1/10* (2006.01)
*H04W 12/50* (2021.01)

(52) U.S. Cl.
CPC .......... *H04R 25/70* (2013.01); *H04R 1/1016* (2013.01); *H04R 25/554* (2013.01); *H04W 12/50* (2021.01); *H04R 25/603* (2019.05); *H04R 2225/55* (2013.01); *H04R 2225/61* (2013.01)

(58) Field of Classification Search
CPC .... H04R 25/70; H04R 1/1016; H04R 25/554; H04R 25/603; H04R 2225/55; H04R 2225/61; H04W 12/50
USPC ......................................................... 381/315
See application file for complete search history.

(56) References Cited

U.S. PATENT DOCUMENTS

| 9,445,204 | B1 * | 9/2016 | Ryan ................... H04R 25/556 |
| 2006/0023904 | A1 * | 2/2006 | Fischer ............... H04R 25/558 |
| | | | 381/312 |
| 2007/0080823 | A1 | 4/2007 | Fu |
| 2012/0087524 | A1 | 4/2012 | Howes |

(Continued)

FOREIGN PATENT DOCUMENTS

EP       0720091 A1    5/2001

OTHER PUBLICATIONS

European Patent Office, International Searching Authority, International Search Report for PCT/EP2017/053207, dated Aug. 23, 2018, Rijswijk, Netherlands.

*Primary Examiner* — Sean H Nguyen
(74) *Attorney, Agent, or Firm* — ALG Intellectual Property, LLC (57) ABSTRACT

A hearing system comprising a hearing device and at least two controllers connected to the hearing device for changing a state of the hearing device, wherein the hearing device is configured to maintain a transaction token having a present value associated with at least one present state parameter value of the hearing device. Each controller is configured to acquire, prior to changing the state of the hearing device, the present transaction token value and the present at least one state parameter value of the hearing device, to change the acquired parameter value, and to send back to the hearing device, as a state change request, the new at least one state parameter value together with the acquired transaction token value.

19 Claims, 5 Drawing Sheets

(56) References Cited

U.S. PATENT DOCUMENTS

| | | |
|---|---|---|
| 2012/0323990 A1 | 12/2012 | Hayworth |
| 2015/0092971 A1* | 4/2015 | Kim .................. H04R 25/30 381/328 |
| 2016/0150575 A1 | 5/2016 | Andersen |
| 2017/0006029 A1 | 1/2017 | Pedersen |

* cited by examiner

HEARING DEVICE WITH MULTIPLE CONSISTENT CONTROLLERS

The invention relates to a hearing system comprising a hearing device and at least two controllers connected to the hearing device for changing a state of the hearing device.

Hearing devices, such as hearing aids or cochlear implants, typically are used together with multiple controllers which communicate with the hearing device so as to control the state of the hearing device. To this end, a controller may read the state (represented by the values of one or more state parameters) of the hearing device, modify the state (i.e. the parameter value(s)) and write the modified state (i.e. the modified parameter value(s)) back to the hearing device. For example, a remote control or a smartphone may be used to control the output volume of the hearing device by reading the present value/setting of the volume, modify the value, for example, by increasing it by 10 units, and send the modified value back to the hearing device so as to increase the volume setting according to the user's desire.

Controlling the state of a hearing device via multiple distributed controllers may result in problems with consistency of the control, which may be particularly annoying if the respective hearing device state is a state perceivable by the user, such as the output volume level.

Figure 1:
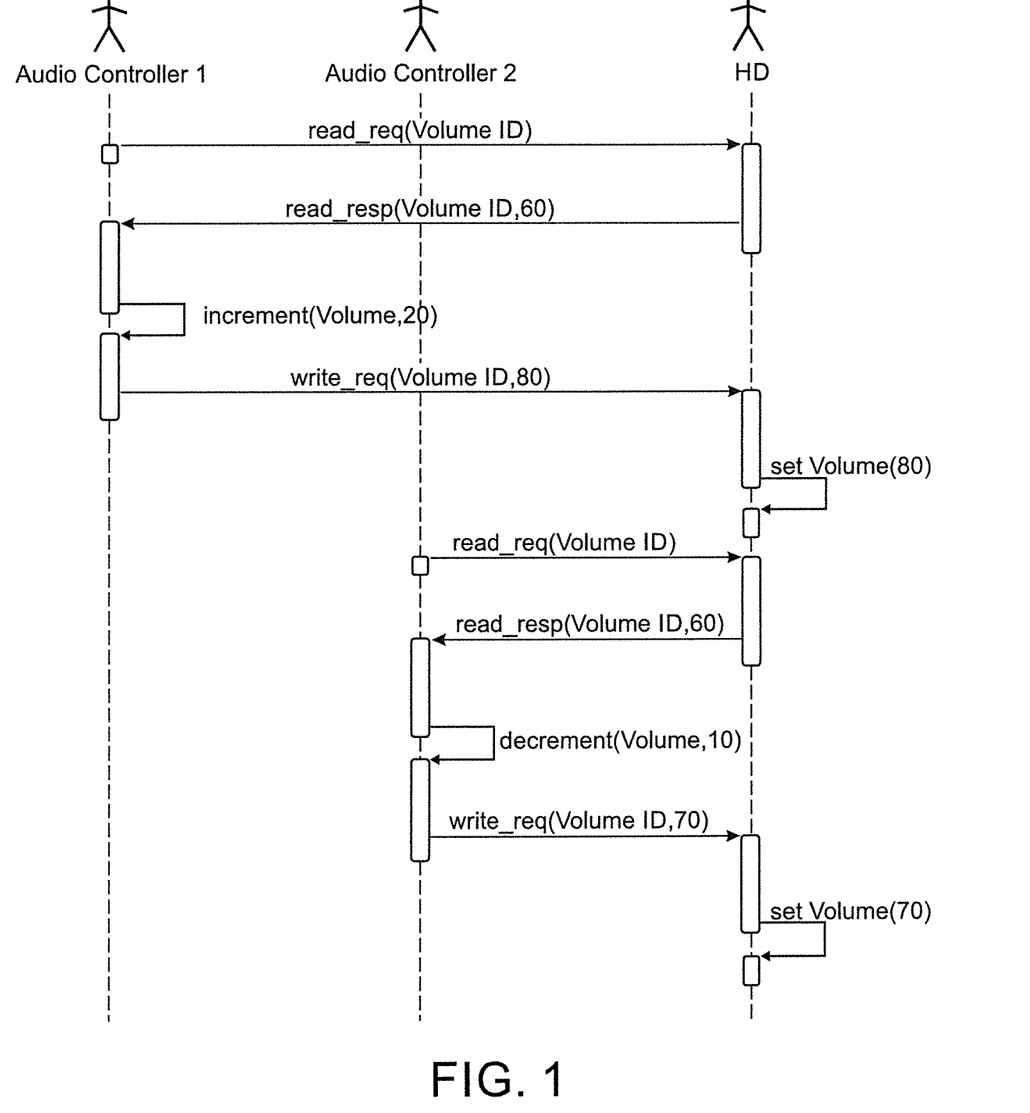
FIG. 1 is a message sequence chart for a hearing system according to the prior art, wherein the volume setting of a hearing device is changed by subsequent action of two audio controllers.
Figure 2:
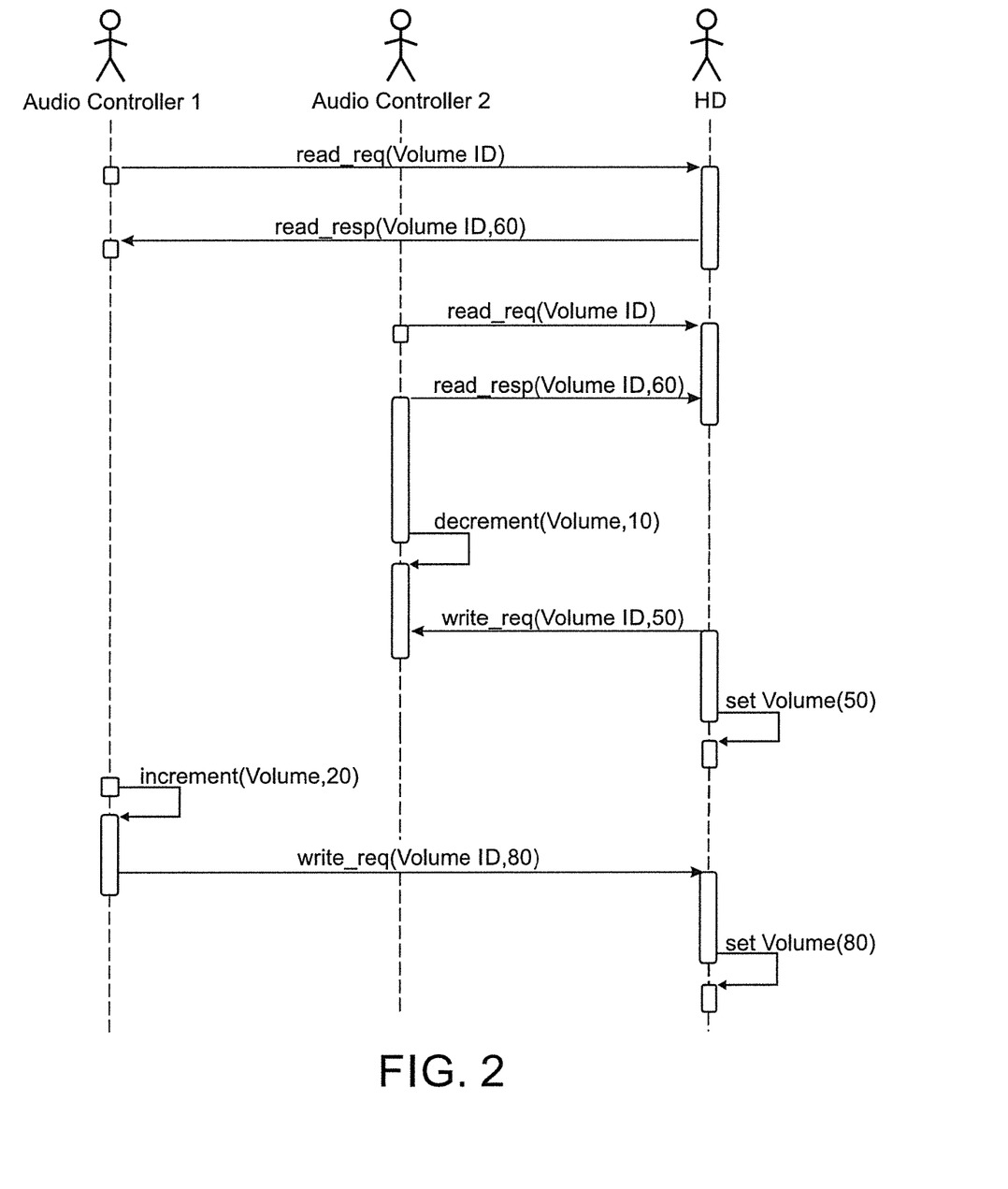
FIG. 2 is a another message sequence chart for such a hearing system, wherein the audio controllers act in an interleaved manner, resulting in a state different from the state of FIG. 1.

An example of a consistency problem when controlling a hearing device by two distributed controllers is illustrated in FIGS. 1 and 2, wherein the hearing device output volume may be controlled by each of two audio controllers 1 and 2. In the example of FIG. 1 the audio controller 1 increases the volume by 20 units while the audio controller 2 thereafter reduces the volume by 10 units, resulting in an end volume setting of "70" when starting with an initial volume setting of "60". While in the example of FIG. 1 the audio controllers 1 and 2 act sequentially on the hearing device, in the example of FIG. 2 there is an interleaved action of the volume controllers 1 and 2, wherein the audio controller 2 decreases the volume by 10 units during the control action by the audio controller 1, so that the control action by the audio controller 2 actually is "lost" in the sense that the end volume is 80 units, corresponding to an increase of the initial volume of 60 units by the audio controller 1 by 20 units (the reason is that the audio controller 1 has read the present volume setting of "60" from the hearing device before it is decreased by 10 units by action of the audio controller 2, with the audio controller 1 sending back the increased volume value of 80 units after the audio controller 2 has terminated its control action). Thus, while the user takes the same manual volume control actions in both the example of FIG. 1 and the example of FIG. 2, the result is different. Such system behavior is not desirable, since it is not consistent with the users expectations.

It is an object of the invention to provide for a hearing system comprising a hearing device and at least two controllers for changing a state of the hearing device, which allows to change the state of the hearing device in a manner which is consistent with the user's expectations. It is a further object to provide for a corresponding control method.

According to the invention, these objects are achieved by a system as defined herein.

The invention is beneficial in that, by maintaining a transaction token in the hearing device, wherein each controller has to prove to the hearing device that it possesses a copy of the presently valid token in order to have a state change requested by that controller accepted by the hearing device, with the present token value being associated with the present state of the hearing device, inconsistent hearing device state change due to interleaved actions of two controllers can be prevented.

Preferred embodiments of the invention are defined in the dependent claims.

Hereinafter, examples of the invention will be illustrated by reference to the attached drawings, wherein.

Figure 3:
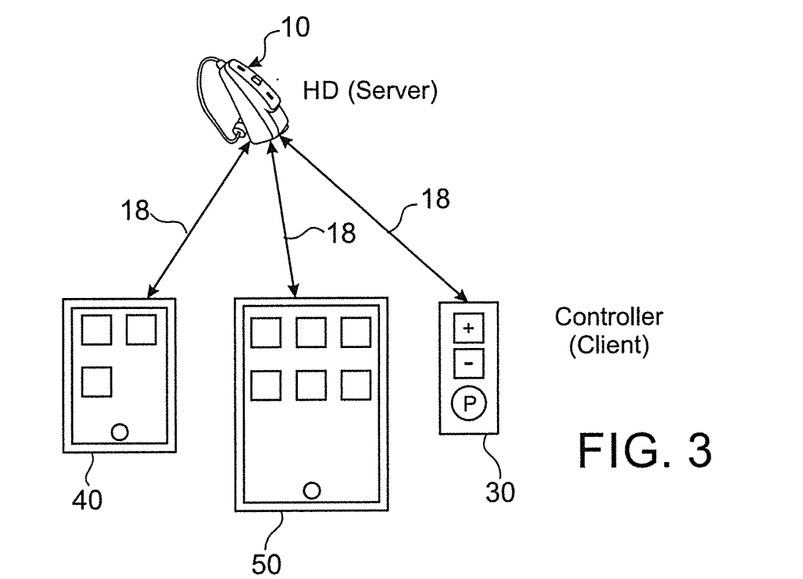
FIG. 3 is a schematic illustration of an example of a hearing system according to the invention, comprising a hearing device communicating with multiple controllers.

FIG. 3 is a schematic illustration of a system according to the invention, comprising a hearing device 10 and a plurality of distributed controllers, such as a remote control 30, a smartphone 40 and a tablet 50, which communicate with the hearing device 10 via a wireless link 18, which typically forms a communication network using, for example, a Bluetooth (BT) protocol, such as BT low energy (alternatively, the communication network may be, for example, a WiFi 802.11) network, a ZigBee network, mobile phone network, a low rate wireless network, such as LoRa, or an Ethernet network). Each of the controllers 30, 40, 50 may change the state of the hearing device 10 by appropriate control action via the link 18.

It is to be noted that the concept of the invention requires only communication between the hearing device and the multiple controllers, while no communication between the controllers is required, although in some cases this may be of interest, such as when the controllers may synchronize their states bilaterally.

Figure 4:
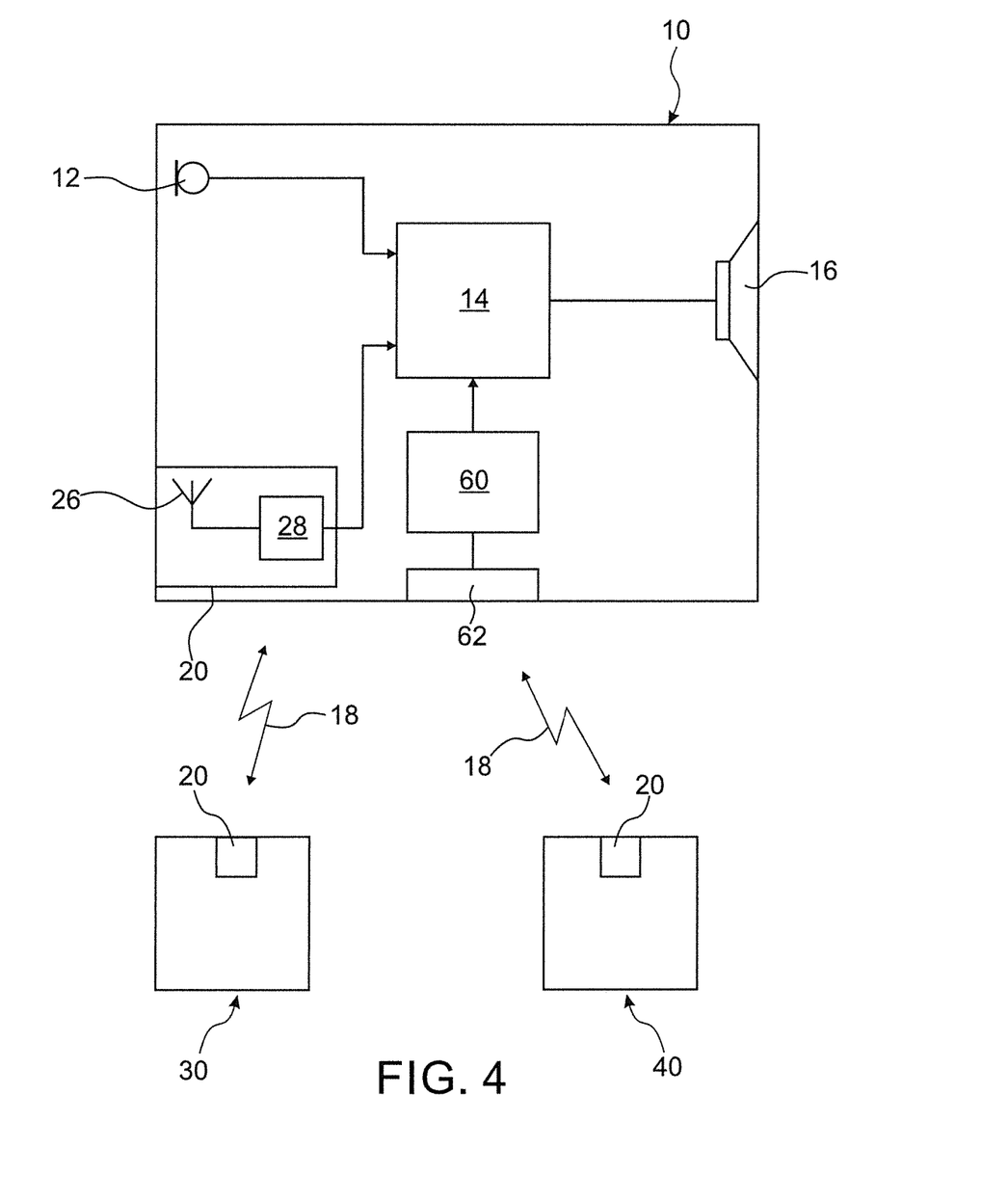
FIG. 4 is an example of a schematic block diagram of the system of FIG. 3.

FIG. 4 is a block diagram of an example of the hearing device 10 which is to be worn at one ear of a user and which typically is used together with a second hearing device to be worn at the other ear of the user (not shown) for forming a binaural hearing system. Preferably, the hearing device 10 is a hearing aid, such as a RIC (Receiver in the canal), BTE (behind-the-ear), ITE (in-the-ear), ITC (in the canal) or CIC (completely-in-the-canal) hearing aid. However, the hearing device, for example, also could be an auditory prosthesis, such as a cochlear implant device comprising an implanted cochlear stimulator and an external sound processor which may be designed as a BTE unit with a headpiece or as an integrated headpiece. According to another example, the hearing device may be a hearable or an earbud.

In the example of FIG. 4, the hearing device 10 is a hearing aid comprising a microphone arrangement 12 for capturing audio signals from ambient sound, an audio signal processing unit 14 for processing the captured audio signals and an electro-acoustic output transducer (loudspeaker) 16 for stimulation of the user's hearing according to the processed audio signals. For example, the audio signal processing in the unit 14 may include acoustic beamforming (in this case, the microphone arrangement 12 comprises at least two spaced apart microphones).

The hearing aid 10 comprises a wireless interface 20 comprising an antenna 26 and a transceiver 28. According to one example, the interface 20 may be a Bluetooth interface, preferably a Bluetooth Low Energy (BTLE) interface. The interface 20 is provided for enabling wireless data exchange between the hearing aid 10 and controllers 30, 40 (the controller 50 of FIG. 3 is not shown in FIG. 4) via a wireless link 18 (the interface 20 also may be used to realize a binaural hearing assistance system, allowing the hearing aid 10 and the contralateral hearing aid to exchange audio signals and/or control data and status data, such as the present settings of the hearing aids).

The controllers or at least one of the controllers may be a device external to (i.e. separate from) the hearing device 10, like the controllers 30, 50, 50 the example of FIGS. 3 and 4. However, at least one of the controllers may be implemented on the hearing device as an "internal" controller (as opposed to the "external" controllers 30, 40, 50 of FIG. 3). An example of such internal controller is illustrated in FIG. 4, wherein the hearing aid 10 also comprises a volume controller 60 connected to a user interface 62, such as a button or toggle switch, for manually adjusting the output volume of the hearing aid 10. Another example of a controller is a program controller for controlling the next audio program in a sequence.

Figure 5:
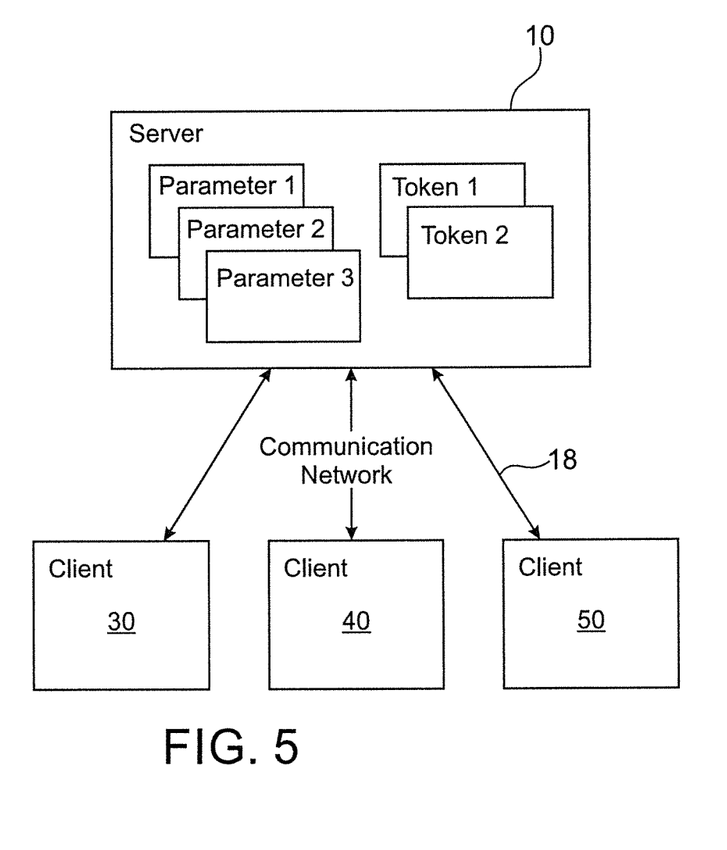
FIG. 5 is a schematic illustration of the control structure of the system of FIG. 3.

As illustrated by the example of FIG. 5, the system of FIGS. 3 and 4 may be described in a more general manner concerning of the data exchange between the system components, wherein the hearing device 10 may be considered to act as a "server" and the controllers 30, 40, 50, 60 may be considered to act as "clients" of the server, wherein the external controllers 30, 40, 50 are connected to the server via a communication network which, in the example of FIGS. 3 and 4 is implemented by the wireless links 18).

The server has at least one parameter, each of which may presently have one value of a plurality of values, i.e. the present value of each parameter is a value from a set of values. Since the parameters are independent, the respective set of values may be different for each parameter. The set of all present parameter values determines the present state of the server. It is noted that hereinafter the "state" of the server/hearing device actually is to be understood as the part of the state of server/hearing device which is configurable by action of the controllers. The server also comprises one or more transaction tokens which are associated with at least one of the parameters; as will be explained later in detail, the relation between tokens and parameters is not necessarily a bijective relation. The clients may use the communication network to read the present attribute value(s), modify the attribute value(s) locally and subsequently write the modified value(s) back to the server. A "token", as used hereinafter, is an object that can take on "token values", i.e. there is a sequence of token values in time.

According to a preferred embodiment, the tokens are managed in a centralized manner wherein exclusively the server, i.e. the hearing device, is allowed to maintain the tokens (i.e. to change the present value of the token or each token), whereas the clients, i.e. the controllers, are not authorized to change or generate tokens.

In the most simple case, there is only one parameter represented by a set of scalar values, i.e. the state of the server/hearing device is determined by the present value of a single state parameter, such as the setting of the output volume.

Figure 6:
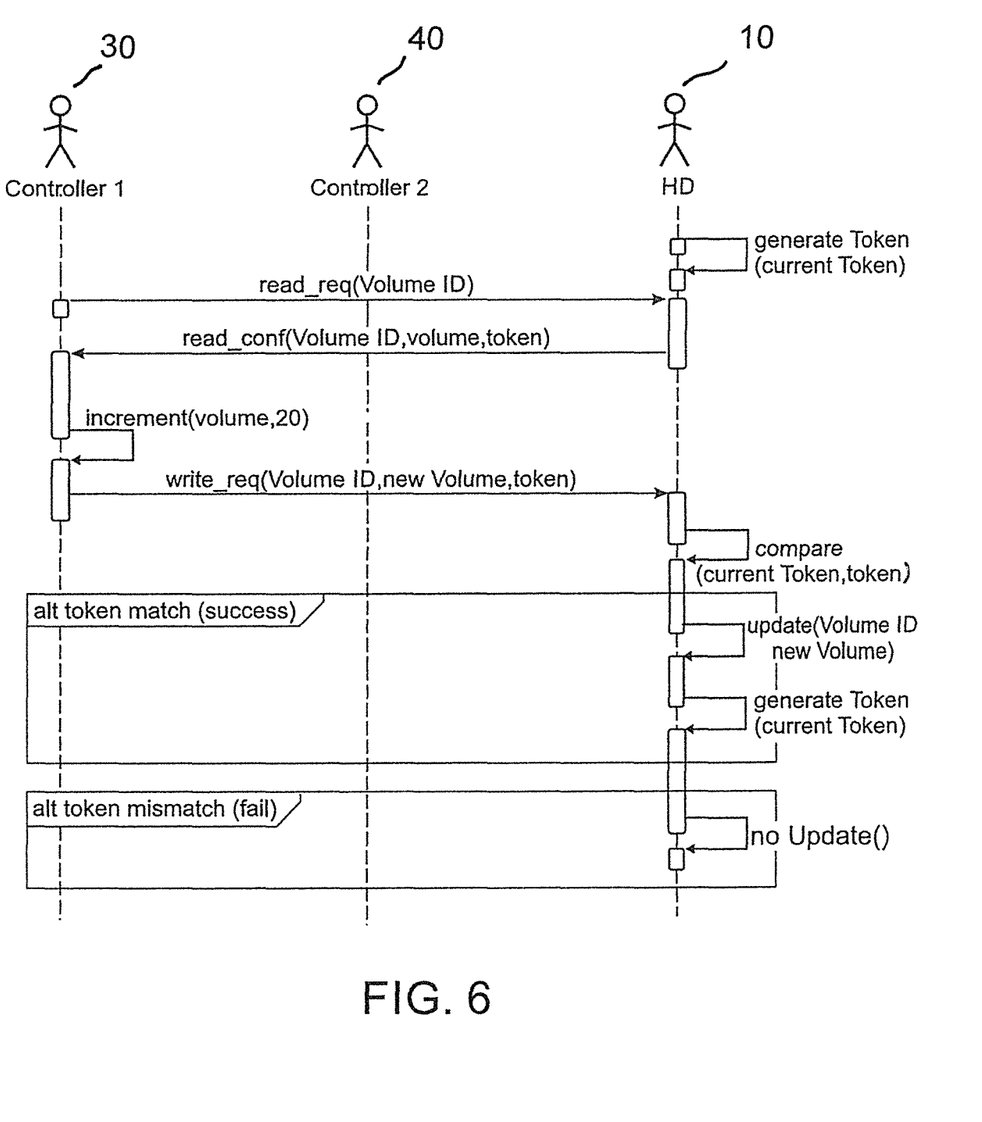
FIG. 6 is an example of a message sequence chart of a volume adjustment process in a system according to the invention.

In FIG. 6 an example of a message sequence chart is shown, wherein the output volume is adjusted by a controller 30. The hearing device 10 maintains a single transaction token which is associated with the current state (e.g. the volume setting) of the hearing device 10, wherein any volume change requested by one of the controllers 30, 40 is accepted by the hearing device 10 only in case that the respective controller is able to prove, by presenting the present token (i.e., in this example, the present value of the token), that it had knowledge of the present hearing device state (i.e. volume setting) at the time it requested a state (i.e. volume) change.

Consequently, the controller has to acquire the token (i.e. the present value of the token) at some point in time prior to changing the state. For example, the controller 30 may request the hearing device 10 to provide it with the present value of the volume setting and with the present value of the token, whereupon the hearing device 10 passes the token to the controller 30 together with the present volume setting, whereupon the controller 30 may adjust the volume value as desired by the user, for example by increasing the volume value by 20 units. Thereafter, the controller 30 sends the modified volume value (i.e. the desired modified hearing device state) back to the hearing device 10, together with the token last received from the hearing device 10, as part of a hearing device state change request.

The hearing device 10, having received the modified volume (state) together with a token, compares the received token with its own present token. If the two tokens (i.e. their values) match, the hearing device 10 knows that the controller 30 had knowledge of the present hearing device state when it requested the state change, so that the hearing device 10 may accept the modified state as the new state, i.e. the hearing device 10 may set the volume value to the changed volume value received from the controller 30, and it generates a new token indicating the new state (i.e. the changed volume value). In this regard it is to be noted that, while the requirement that the received transaction token value matches with the present transaction token value is a necessary condition for accepting the modified state as the new state, there may be additional necessary conditions for the acceptance of the modified state, such as the requirement that new parameter value is within an allowed range.

If the token received from the controller 30 does not match with the token of the hearing device 10, this means that the hearing device state has changed since the controller 30 last received the hearing device state along with a token, with the hearing device accordingly having generated a new token since. Accordingly, the controller 30 did not request the state change based on the present hearing device state, so that the hearing device 10 rejects (or simply disregards) the state change request and does not generate a new token value. As a result, the state (volume setting) remains unchanged, thereby preventing inconsistent adjustment of the state.

While the hearing device states, as mentioned above, may be defined by a single scalar parameter, in other cases the hearing device states may be defined by a plurality of scalar parameters (in such cases, assuming that the hearing device states are defined by n parameters, each hearing device state would be represented by a n-dimensional vector or by multiple multi-dimensional vectors that together make of the state). Referring to the representation of FIG. 5, in this case each parameter would represent a separate attribute. It is also to be noted that rather than being scalar, each parameter may be of a more complex nature.

According to one example, in case that there is a plurality of parameters, a separate token may be assigned to each state parameter according to a bijective relation. According to an alternative example, related parameters may be grouped (a group corresponds to an arbitrary collection of attributes/ parameters depending on the application needs; for example, a group may be a set of related parameters), in which case a separate token may be assigned to each group of related state parameters. For example, in the case illustrated in FIG. 5, token 1 may be assigned to a group formed by parameters 1 and 2, while token 2 may be assigned to parameter 3. In case of multiple tokens, each token will be separately used in the manner described so far for a single token: for example, if one of parameters 1 and 2 is to be changed by a controller, token 1 will be acquired, transmitted, compared and finally updated if the state change is accepted; if parameter 3 is to be changed by a controller, token 2 will be acquired, transmitted, compared and finally updated if the state change is accepted.

According to a further alternative embodiment, a single token may be assigned to all state parameters (in this case, a new token would be generated each time at least one of the parameters is changed); this variant is preferred, since in this case only a single token instance needs to be maintained, which simplifies the system.

According to one example, the token values may be generated as a sequence of token values by using a state enumeration function, wherein upon each state change the next token values of the sequence is selected at the presently valid token value. To this end, any function may be employed which generates a sequence of token values in such a manner that the present token value can be distinguished from previous token values by the hearing device when receiving the token from one of the controllers. For example, the token generation function can be such that it generates an infinite (i.e. non-repeating) sequence of token values, for example by using a simple infinite incrementer. More practically, by contrast, a function can be used which generates a sequence wherein. token values may repeat after some time, but with a sufficiently large time interval between repetitions, so that it is highly unlikely that two controllers may have an identical token value which, however, is associated with two different states.

For example, for generating token value sequences, one may use, for example: an incrementer with wrap-around, for example a 32-bit counter; a linear feedback shift register (LFSR); a time stamp; or a sequence of random numbers.

It is to be noted that using a sequence of truly random numbers is suitable for centralized token management only (wherein, as mentioned above, exclusively the server/hearing device is allowed to maintain the tokens), since such function is not deterministic, so that different instances which generate tokens, such as the hearing device and a requesting controller, would end up at different token values for the same state. However, a pseudo-random number generator could be used both for centralized token management and for distributed token management, because it is deterministic.

As an alternative to the above discussed state enumeration functions, wherein each token is associated with a certain state by its place in a sequence, the tokens may be generated in such a manner that each token is representative of the present state, for example, representative of the present value of a state parameter or the present values of a combination of parameters, such as volume and bass/treble balance). For example, if a certain state is reached twice, for example when the user changes the volume from a first level to a second level and then back to the first level, then this would result in the same token value being used for the first level (the rationale in this case is that it is not the time at which a certain state is reached which is relevant for determining whether the hearing device should accept a state modification, but rather it is relevant whether the controller requesting the state change head knowledge of the present state of the hearing device). In the most simple case, the state representation function generating the token value may be the state itself, i.e. the value of the respective state parameter. This is useful for simple states, such as the case in which the state parameter is a scalar value, e.g. the volume level.

According to an alternative example, the token generation function may be a perfect hash function on the state. This embodiment is useful for complex states where a bijective mapping between the state and the hash value is needed.

According to a further alternative example, the token generation function may be a non-perfect hash function of the state, which embodiment is useful if a surjective mapping is deemed acceptable due to a very low probability of collision (i.e. in case that there is a low chance of mapping different states to the same hash value).

Preferably, the hearing device, after having received a state change request and having handled the state change request, i.e. after having processed a state change request by either allowing (i.e. accepting) or rejecting (or disregarding) the request, may notify at least the controller from which it has received the state change request, with such notification relating at least to the present token of the hearing device. In addition, the hearing device may notify at least the controller from which the state request has been received of the present state of the hearing device. Such state notification may include the entire state of the hearing device as far as it is associated with the token or it may contain only the change(s) relative to the last state (which requires less data to be transferred and thus may be faster and consume less energy).

According to one embodiment, the hearing device may notify only that controller from which it has received the state change request. According to an alternative embodiment, the hearing device may notify all controllers which have previously registered with, i.e. which are paired with (in case of a Bluetooth system) and in communication range with, the hearing device for control of the hearing device.

The notifications preferably are sent reliably, i.e. with feedback from the controller(s) that the notification has been correctly received by the controller. Alternatively, the notifications may be sent over an unreliable channel, in particular by broadcasting, so that the hearing device does not receive feedback from the controller(s) concerning receipt of a notification; thereby all controllers may be notified with a single message. For example, when using a BT low energy protocol, notifications may be sent point-to-point reliably, or they may be broadcast in advertisement packets, which latter process would not guarantee reliability. Broadcast notification may be preferable if there is a large number of controllers or if managing of the registered devices is otherwise undesired. In order to enhance chances of getting the notification through by broadcasting, the hearing device may use measures like sending the notification multiple times, using channel coding, using different frequencies, etc. In BT Low Energy, the hearing device may use, as already mentioned above, advertisements to broadcast the notification, wherein it may add the notification message as payload data to advertisement packets sent out once or repeatedly.

Preferably, the notifications are centralized, i.e. only the hearing device provides for notifications concerning the present token (or concerning the present token and the present state) after a state change request has been received, so that a star topology is used wherein the controllers only have to communicate with the hearing device but not among each other (by contrast, decentralized notifications would require that controllers could individually notify each other of state changes in a peer-to-peer fashion).

Further, the notification may depend on whether the requested state change was successful or not. For example, in case of a successful state change, i.e. with the hearing device having accepted the state change request, the hearing device may notify that controller which has requested the state change of the current token value only, since that controller already has knowledge of the present requested new state, while other registered controllers may be notified both of the present token value and the present hearing device state.

If in case of a successful state change no notifications were sent, all controllers, including that controller which has requested the state change, always would have to request the present state and the present token value from the hearing device before sending a state change request.

According to one embodiment, in case of a rejected state change the hearing device does not issue any notification so that also that controller which requested the state change is not made aware of the failure to change the state. This may be advantageous in case that the controller is not interested in maintaining the state, for example if the controller powers down after sending its state change request.

According to a preferred embodiment, the controller which has requested that state change is notified by the hearing device independently of whether its request was successful or not, with the hearing device sending both the present token value and the present state to that controller. According to a preferred variant of this embodiment, in case that the state change request was successful, the hearing device may send only the present token value but not the present state, as mentioned above.

When notifying only the controller which requested the present state change, only that controller will know the present hearing device state, so that other controllers will have to first obtain the present state and the present token value by request from the hearing device when intending to request a state change. In particular, such embodiment is beneficial in case that the user using a certain controller to interact with the hearing device is likely to use the same controller in the near future again ("temporal locality heuristic").

According to one embodiment, in case that the hearing device comprises an internal controller for changing the state of the hearing device (for example, a volume controller, cf. volume controller 60 in FIG. 4) the external controller (or one of the external controllers in case that there is more than one external controller) may be elected as a preferred controller, to which a notification is sent when the hearing device state has changed upon a state change request from the internal controller.

The embodiments described so far relate to a centralized token management by the hearing device, wherein the controllers have to acquire the transaction token and the hearing device state from the hearing device, such as by (actively) requesting the token and/or the state from the hearing device or by (passively) receiving the token and/or the state via a notification from the hearing device after a state change request (caused by the same controller or by another controller). While such centralized token management is preferred, there are also embodiments conceivable, in which the token management is distributed, wherein the transaction tokens may be maintained by cooperation of the hearing device and at least one of the controllers. In such case both the hearing device and that at least one of the controllers may generate tokens; however, in this case the tokens have to be generated by using a deterministic function known both to the hearing device and that at least one of the controllers.

According to one example of this principle, when a controller requests a state change, it provides the changed state along with its copy of the token and advances its copy of the token to the next token value, assuming that the state change request will be successful. If this is indeed the case, also the hearing device then advances its token to the next token value, so that now both devices have the same token value and the same state (parameter) value available. If, however, the state change request fails (because the state of the hearing device has changed otherwise in the meantime), the hearing device communicates the present state and the present token value to the controller having requested the state change so as to re-synchronize that controller.

The invention claimed is:

1. A hearing system comprising: a hearing device, wherein the hearing device is configured to maintain a transaction token value associated with a present state parameter value of the hearing device; two controllers configured to wirelessly communicate with the hearing device to change a state of the hearing device, wherein each controller is configured: to acquire, prior to changing the state of the hearing device, the transaction token value and the present state parameter value of the hearing device, to change the present state parameter value, and to send back to the hearing device, as a state change request, a new present state parameter value together with the transaction token value; and wherein the hearing device is configured: to compare a new state parameter value and a received transaction token value from one of the controllers with the present transaction token value of the hearing device, wherein a requirement that the received transaction token value matches the present transaction token value is a necessary condition for accepting the new state parameter value as the present state parameter value, and to disregard the new state parameter value if the received transaction token value does not match with the present transaction token value.

2. The hearing system of claim 1, wherein each controller is further configured to acquire the transaction token value and/or the present state parameter value by requesting it from the hearing device.

3. The hearing system claim 1, wherein the hearing device is configured to notify, after having processed a state change request at least the controller from which the state change request has been received of at least the present transaction token value.

4. The hearing system of claim 3, wherein the hearing device is configured to notify, after having processed a state change request, at least the controller from which the state change request has been received at least of the present transaction token value and the present at least one parameter value.

5. The hearing system of claim 4, wherein the hearing device is configured to notify only the controller from which the state change request has been received.

6. The hearing system of claim 4, wherein the hearing device is configured to notify all of the controllers which are registered with and in communication range with the hearing device.

7. The hearing system of claim 4, wherein the hearing device is configured to wait for feedback from the two controllers with regard to receipt of the notification.

8. The hearing system of claim 4, wherein the hearing device is configured to broadcast the notification.

9. The hearing system of claim 4, wherein one of the two controllers is implemented on the hearing device as an internal controller and one of the two controllers is an external device from the hearing device.

10. The hearing system of claim 4, wherein the hearing device is configured to generate the transaction token as a sequence of token values by using a state enumeration function, wherein upon each state change a next transaction token value of the sequence is selected as the present transaction token value.

11. The hearing system of claim 10, wherein the state enumeration function includes a truly-random-number generator or a pseudo-random-number generator.

12. The hearing system of claim 4, wherein the hearing device is configured to generate the transaction token such that each transaction token value is representative of the present value of said at least one state parameter.

13. The hearing system of claim 12, wherein there is a single scalar state parameter and wherein the token value equals the present value of the single state parameter.

14. The hearing system of claim 1, wherein the hearing device is configured to notify, after having accepted a state change request, at least the controller from which the state change request has been received of the transaction present token value only.

15. A method for controlling a hearing device comprising: maintaining, at a hearing device, a first transaction token value associated with a present state parameter value of the hearing device; receiving, from a first controller, a request for the first transaction token value and the present state parameter value of the hearing device; transmitting, by the hearing device, the first transaction token value and the present state parameter value; receiving, from the first controller or a second controller, a second state parameter value together with a second transaction token value, wherein the second state parameter value is associated with a request to change the present state value of the hearing device; and comparing, by the hearing device, the second transaction token value with the first transaction token value of the hearing device, wherein the requirement that the second transaction token value matches with the first transaction token value is a necessary condition for accepting the second state parameter value as the first state parameter value; and disregarded if the second transaction token value does not match with the first transaction token value.

16. A hearing device comprising: a processor; a memory coupled to the processor, wherein the memory stores instructions, which when executed by the processor cause the hearing device to perform operations, the operations comprising: maintain, at a hearing device, a first transaction token value associated with a present state parameter value of the hearing device; receive, from a first controller, a request for the first transaction token value and the present state parameter value of the hearing device; transmit, by the hearing device, the first transaction token value and the present state parameter value; receive, from the first controller or a second controller, a second state parameter value together with a second transaction token value, wherein the second state parameter value is associated with a request to change the present state value of the hearing device; and compare, by the hearing device, the second transaction token value with the first transaction token value of the hearing device, wherein the requirement that the second transaction token value matches with the first transaction token value is a necessary condition for accepting the second state parameter value as the first state parameter value; and disregard if the second transaction token value does not match with the first transaction token value.

17. The hearing device of claim 16, further comprising: a loudspeaker, a microphone, a behind-the-ear component and an in-the-ear component.

18. The hearing device of claim 16, wherein the state parameter value is associated with a volume of the hearing device.

19. The hearing device of claim 16, further comprising an internal controller, wherein the internal controller is the first controller.

* * * * *